Dec. 4, 1928.  
G. D. HAUSER  
1,693,950  
PORTABLE ELECTRIC HEATER  
Filed July 1, 1926
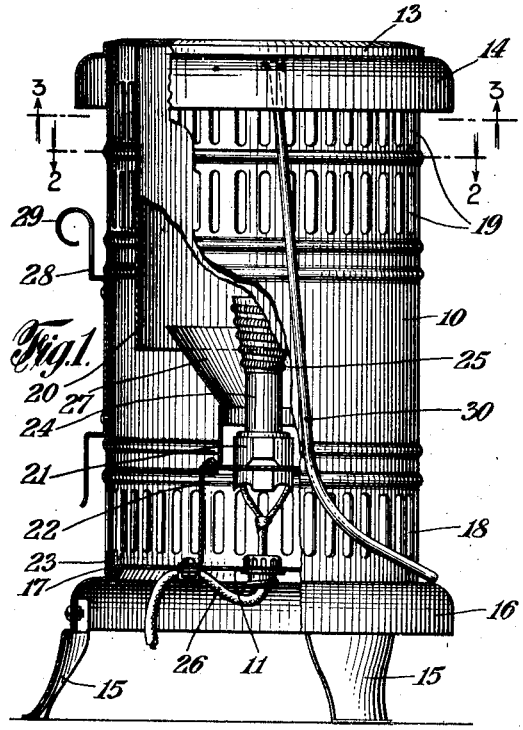
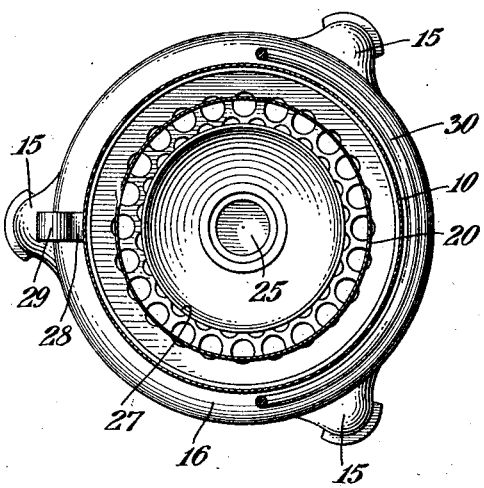
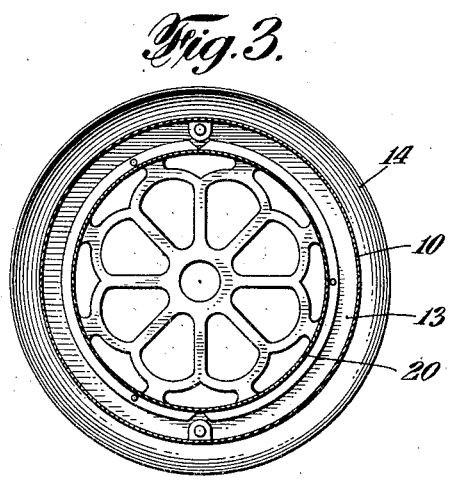
Inventor  
George D. Hauser  
By his Attorneys  
Kenyon & Kenyon Patented Dec. 4, 1928.

1,693,950

UNITED STATES PATENT OFFICE.

GEORGE D. HAUSER, OF UTICA, NEW YORK, ASSIGNOR TO UTICA PRODUCTS, INC., OF UTICA, NEW YORK, A CORPORATION OF NEW YORK.

PORTABLE ELECTRIC HEATER.

Application filed July 1, 1926. Serial No. 119,820.

This invention relates to heaters and more particularly to practical electric furnaces or stoves.

An object of the invention is an efficient electric stove in which the outer peripheral wall remains sufficiently cool that the heater may be readily handled for example when it is desired to remove the heater from one position to another.

According to this invention the stove comprises a cylindrical shell having apertures near its top and bottom edges and an apertured cover closing the upper end of the shell, said cover having a dependent flange spaced exteriorly of the shell. A perforated bottom plate supports a heating element around which is arranged an upwardly diverging reflector. An inner shell spaced from the outer shell is supported from the cover and terminates just below the upper edge of the reflector. With this arrangement the bulk of the air travels up through the holes in the base, or around the reflector and out through the apertures in the top. Sufficient air enters the apertures in the outer shell and travels up between the inner and outer shell and out the upper perforations of the outer shell to keep the latter cool.

Other objects, novel features and advantages of this invention will be apparent from the following specification and accompanying drawings wherein, Fig. 1 is an elevation partially broken away of a heater embodying the invention.

Fig. 2 is a section on the line 2—2 of Fig. 1, and

Fig. 3 is a section on the line 3—3 of Fig. 1.

10 represents the body of the stove which comprises a cylindrical shell, the lower end of which is closed by a perforated bottom plate and the upper end of which is closed by an apertured cover having a dependent flange 14 spaced from the shell 10. The heater is supported by legs 15 attached to a flange 16 integral with the bottom plate 11. Tabs 17 are struck up out the bottom plate and bolted to the shell 10 to connect the bottom plate and shell. Apertures 18 are provided in the shell 10 near its lower edge and corresponding apertures 19 are provided in the shell near its upper edge.

An inner shell 20 is attached at its upper end to the cover 13 and is co-axial with the shell 10. A socket 21 is supported from the bottom plate 11 through the medium of a bridge 22 secured to the plate 11 by bolts 23. Mounted within the socket 21 is a hollow plug 24 of refractory material supporting a heating element 25 in the form of a wire of high electrical resistance. The element 25 as shown is connected at its ends in the usual manner with contacts by means of which it may be connected in an electric circuit by being screwed into the socket 21. Current from a suitable source may be supplied through a cable 26, the end of which may be suitable for connection to the usual electric circuits in dwelling houses. An inverted polished reflector 27 surrounds the heating element and serves to direct the heat radiated from the heating element toward the apertures in the cover.

A bracket 28 is provided on the shell 10 and may be used as a cleat upon which to wind up the electric cable when the stove is not in use and is formed with a curved portion 29 which may be used as a handle to carry the stove from one place to another; also the stove may be carried by means of the flange 14 which because of the structure of the stove does not become excessively warm.

In this stove the bulk of the air heated by the heating unit is drawn in through the holes in the bottom plate 11, passes up around the heating element and is discharged through the apertures in the top. Sufficient air, however, enters the perforations 18, travels up between the inner and outer shells and escapes by way of the apertures 19 to keep the outside shell cool. Air escaping from the upper row of apertures 19 comes in contact with the flange 14 thereby keeping it cool enough to permit grasping it to remove the stove from one position to another. The inner shell 20 is permanently attached to the cover 13 which is attached to the shell 10 by bolts and can be readily removed with the cover and easily cleaned.

To permit tipping the stove into an inclined position a bail 30 is pivoted to the upper edge of the shell 10 at a point above the lower edge of the flange 14 so that contact of the bail with the flange limits the swinging movement of the bail. The stove may thus be supported on two of its legs and the bail in an inclined position.

It is, of course, understood that various modifications may be made in the structure of the device above disclosed without in any way departing from the spirit of the invention as set forth in the appended claims.

Having thus described my invention, what I claim as new and desire to secure by Letters Patent of the United States is:—

1. A heater comprising a body having top, bottom and lateral walls, a tubular shell extending from the top wall and forming with the lateral wall a chamber having its lower end open, a heating element at the lower end of said shell and an upwardly directed tapered reflector surrounding said heating element, said top wall having apertures through which said shell communicates directly with the atmosphere.

2. A heater comprising a body having bottom, top and lateral walls, a tubular shell extending from the top wall and forming with the lateral wall a chamber having its lower end open, said lateral wall having apertures adjacent its top and bottom edges, a heating element at the lower end of said shell, and an upwardly directed tapered reflector surrounding said heating element, the said top wall having apertures through which said shell communicates directly with the atmosphere.

3. A heater comprising a body having apertured top and bottom walls and a lateral wall having apertures adjacent its upper and lower edges, a tubular shell supported by said top wall and forming with said lateral wall a chamber having its lower end open, a heating element at the lower end of said shell, an upwardly directed tapered reflector surrounding said heating element, and a flange depending from said top wall and spaced exteriorly from said lateral wall.

4. A heater comprising a body having top, bottom and lateral walls, a tubular shell extending from the top wall and forming with the lateral wall a chamber having its lower end open, a standard supported by the bottom wall, a heating element carried by said standard and projecting into said shell, and an upwardly-directed tapered reflector surrounding said heating element, said top wall having apertures through which said shell communicates directly with the atmosphere.

In testimony whereof, I have signed my name to this specification.

GEORGE D. HAUSER.